(12) United States Patent
Lee et al.

(10) Patent No.: US 7,218,863 B2
(45) Date of Patent: May 15, 2007

(54) OPTICAL TRANSMISSION SYSTEM FOR OPTIMIZING BIAS OF LASER DIODE FOR SCM ANALOG OPTICAL SIGNAL

(75) Inventors: Chang-Hyun Lee, Suwon-shi (KR); Chan-Yul Kim, Puchon-shi (KR); Yun-Je Oh, Yongin-shi (JP); Jun-Ho Koh, Suwon-shi (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 694 days.

(21) Appl. No.: 10/638,453

(22) Filed: Aug. 11, 2003

(65) Prior Publication Data
US 2004/0131365 A1 Jul. 8, 2004

(30) Foreign Application Priority Data
Jan. 4, 2003 (KR) .................. 10-2003-0000459

(51) Int. Cl.
*H04B 10/04* (2006.01)
(52) U.S. Cl. ..................... 398/183; 398/194
(58) Field of Classification Search ........ 398/182–191, 398/202–211
See application file for complete search history.

(56) References Cited

U.S. PATENT DOCUMENTS 6,687,451 B1 * 2/2004 Sikora ..................... 398/187

FOREIGN PATENT DOCUMENTS

JP 08-204635 8/1996

* cited by examiner

*Primary Examiner*—David C. Payne
(74) *Attorney, Agent, or Firm*—Cha & Reiter, L.L.C.

(57) ABSTRACT

An optical transmission system for optimizing the bias of a laser diode during an SCM analog optical transmission includes an optical transmitter for converting a baseband electric signal into an optical signal using a laser diode according to the set bias and outputting the optical signal through an optical line, an optical receiver for converting the optical signal transmitted from the optical transmitter into the baseband electric signal, a recovery unit for detecting an error generated according to the bias of the laser diode on the basis of the electric signal converted by the optical receiver, and a bias adjuster for optimally adjusting the bias of the laser diode on the basis of a value of the error detected by the reproducer.

6 Claims, 4 Drawing Sheets

OPTICAL TRANSMISSION SYSTEM FOR OPTIMIZING BIAS OF LASER DIODE FOR SCM ANALOG OPTICAL SIGNAL

CLAIM OF PRIORITY

This application claims priority to an application entitled "Optical transmission system for optimizing bias of laser diode for SCM analog optical signal," filed in the Korean Intellectual Property Office on Jan. 4, 2003 and assigned Serial No. 2003-459, the contents of which are hereby incorporated by reference.

BACKGROUND OF THE INVENTION

1. Field of the Invention

The present invention relates to a subcarrier multiplexing (SCM) analog optical transmission system, and more particularly to an SCM analog optical transmission system for optimizing the bias of a laser diode that converts an electric signal into an optical signal.

2. Description of the Related Art

Generally, in a subcarrier multiplexing (SCM) analog optical transmission, a composite second order (CSO) value is changed in accordance with the set bias of a laser diode for converting an electric signal into an optical signal to be transmitted. The CSO value acts as an even-order nonlinear noise component of a second order or higher with respect to a carrier signal and deteriorates a carrier-to-noise (CNR) ratio of the carrier signal. As such, the CSO tend to serve as noise factors in a signal distribution of a wide band, such as a spectrum of a cable television signal. Accordingly, in order to reduce the CSO in the SCM analog optical transmission, it is necessary to optimize the bias of the laser diode.

FIG. 1 is a block diagram illustrating a conventional optical transmission system and includes a modulation section 10, an electric-to-optic converter 12, an adjustment section 26, a optic-to-electric converter 16, a demodulation section 18, a spectrum generation section 24, and an signal generation section 22.

In operation, the modulation section 10 performs a subcarrier multi-modulation of baseband electric signals. At this time, pulse signals generated from the error testing section 22 are inputted to the modulation section 10. The electric-to-optic converter 12 converts the multi-modulated electric signals into optical signals according to the bias of a laser diode and transmits the optical signals through an optical line 14. The adjustment section 26 adjusts manually the bias of the laser diode, which converts the electric signals into the optical signals.

The optic-to-electric converter 16 converts the optical signals transmitted through the optical line 14 into the electric signals. The demodulation section 18 demodulates the converted electric signals corresponding to the modulation operation of the modulation section 10. Meanwhile, the spectrum generation section 24 monitors the carrier-to-noise ratio (CNR) from the electric signals converted by the optic-to-electric converter 16. At this time, the electric signals demodulated by the demodulation section 18 is fed to the signal generation section 22 to test bit error rate. The error testing section 22 in turn forwards the detected error rate to the modulation section 10. To this ends, the signal generation section 22 tests the bit error rate in regard to the demodulated electric signal. Finally, the spectrum generation section 24 displays the electric signals converted by the optic-to-electric converter 16 as spectra.

Note that an operator determines whether to adjust the bias of the laser diode by observing the spectrum of the electric signal displayed on the spectrum generation section 24, then manually adjusts the bias of the laser diode by manipulating the adjustment section 26.

However, in case of adjusting the bias of the laser diode using the conventional optical transmission system as described above, the operator must adjust the bias of the laser diode manually, by directly manipulating the adjustment section 26 and this causes inconvenience. In addition, when the operator directly manipulates the adjustment section 26 while observing the spectrum of the electric signal displayed on the spectrum generation section, it tend to be difficult to optimize the bias of the laser diode precisely.

Accordingly, there is a need for an improved way of optimizing the bias of a laser diode that can be implemented in an optical transmission system.

SUMMARY OF THE INVENTION

The present invention provides a SCM analog optical transmission system that can simply and easily optimize the bias of a laser diode.

One aspect of the present invention to provide a SCM analog optical transmission system that can adjust the bias of a laser diode for optimization accurately.

In one embodiment, there is provided a SCM analog optical transmission system for optimizing a bias of a laser diode which includes: an optical transmitter for converting baseband electric signals into an optical signal using a laser diode, for converting the electric signals into the optical signal according to the set bias, and for outputting the optical signal through an optical fiber, an optical receiver for converting the optical signal transmitted from the optical transmitter into the baseband electric signals; a recovery unit for detecting an error generated according to the bias of the laser diode on the basis of the electric signals converted by the optical receiver; and, a bias adjuster for optimally adjusting the bias of the laser diode on the basis of a value of the error detected by the recovery unit.

In another embodiment, the optical transmitter includes a modulation section for modulating a plurality of baseband electric signals by combining the baseband electric signals with a subcarrier, a multiplexer for multiplexing the plurality of electric signals modulated by the modulation section into one electric signal, and an electric-to-optic converter for converting the electric signal multiplexed by the multiplexer into an optical signal on the basis of the bias of the laser diode set according to the control of the bias adjuster.

In another embodiment, the optical receiver includes a optic-to-electric converter for converting the optical signal transmitted from the electric-to-optic converter into an electric signal of a set level, a demultiplexer for demultiplexing the electric signal converted by the optic-to-electric converter into a plurality of electric signals, a demodulation section for demodulating the baseband electric signals by detecting the subcarrier from the plurality of demultiplexed electric signals, and a selection section for outputting the plurality of demultiplexed electric signals, selecting a digital electric signal modulated by the modulation section among the plurality of electric signals.

In another embodiment, the recovery unit includes a clock recovery section for recovering a sampling clock with respect to the digital electric signal outputted from the selection section, a data recovery section for recovering data of the electric signal outputted from the selection section through the restored sampling clock and an eye-open parameter, and an error detection section for detecting the error value for the bias of the laser diode with respect to the electric signal by comparing a certain signal distributed in the eye-open parameter with a specified phase value and voltage value with a threshold value fixedly set in the eye-open parameter. The recovery unit comprises a "VSC8123" chip.

In another embodiment, the bias adjuster includes a storage section for storing the error value for the electric signal detected by the error detection section, a control section for controlling an operation for adjusting the bias of the laser diode and calculating an optimum bias value of the laser diode on the basis of the error value stored in the storage section, and a digital-to-analog converter for optimally adjusting the bias of the laser diode by converting the optimum value into an analog signal.

According to the teachings of the present invention, the bias of the laser diode can be more adjusted easily to an optimum value by detecting the error of the converted and transmit electric signal according to the bias of the laser diode, while optimizing the bias of the laser diode automatically on the basis of an intermediate value of a bias section in which an eye-opening area becomes maximum. Moreover, a more favorable optical signal can be created and restored by optimizing the bias of the laser diode automatically whenever an error value generated from the optical signal according to the bias of the laser diode is changed.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Figure 1:
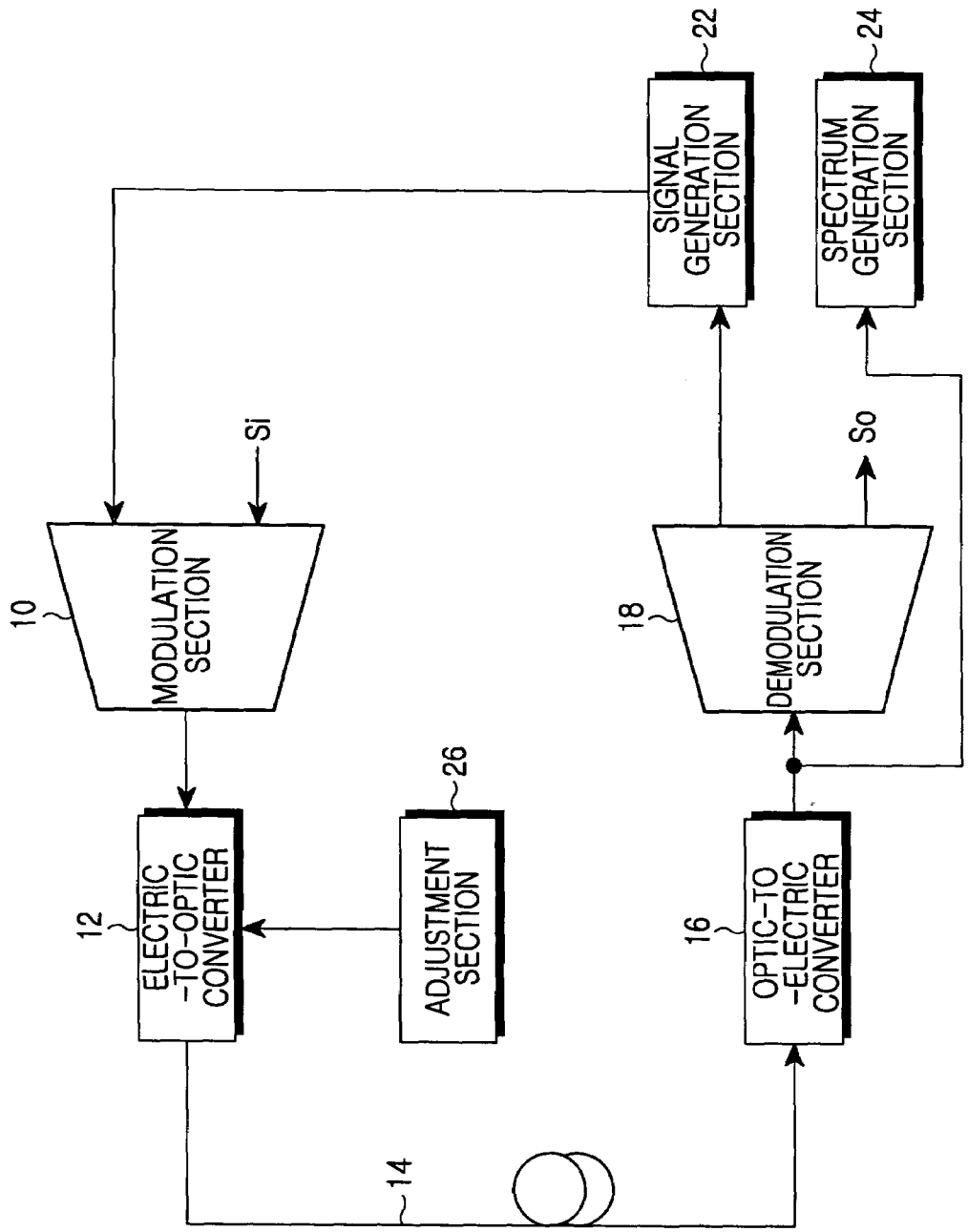
FIG. 1 is a block diagram illustrating an example of a general optical transmission system.

Hereinafter, preferred embodiments of the present invention will be described with reference to the accompanying drawings. It should be noted that the same elements are indicated with the same reference numerals throughout the drawings. For the purposes of clarity and simplicity a detailed description of known functions and configurations incorporated herein will be omitted as it may make the subject matter of the present invention unclear.

Figure 2:
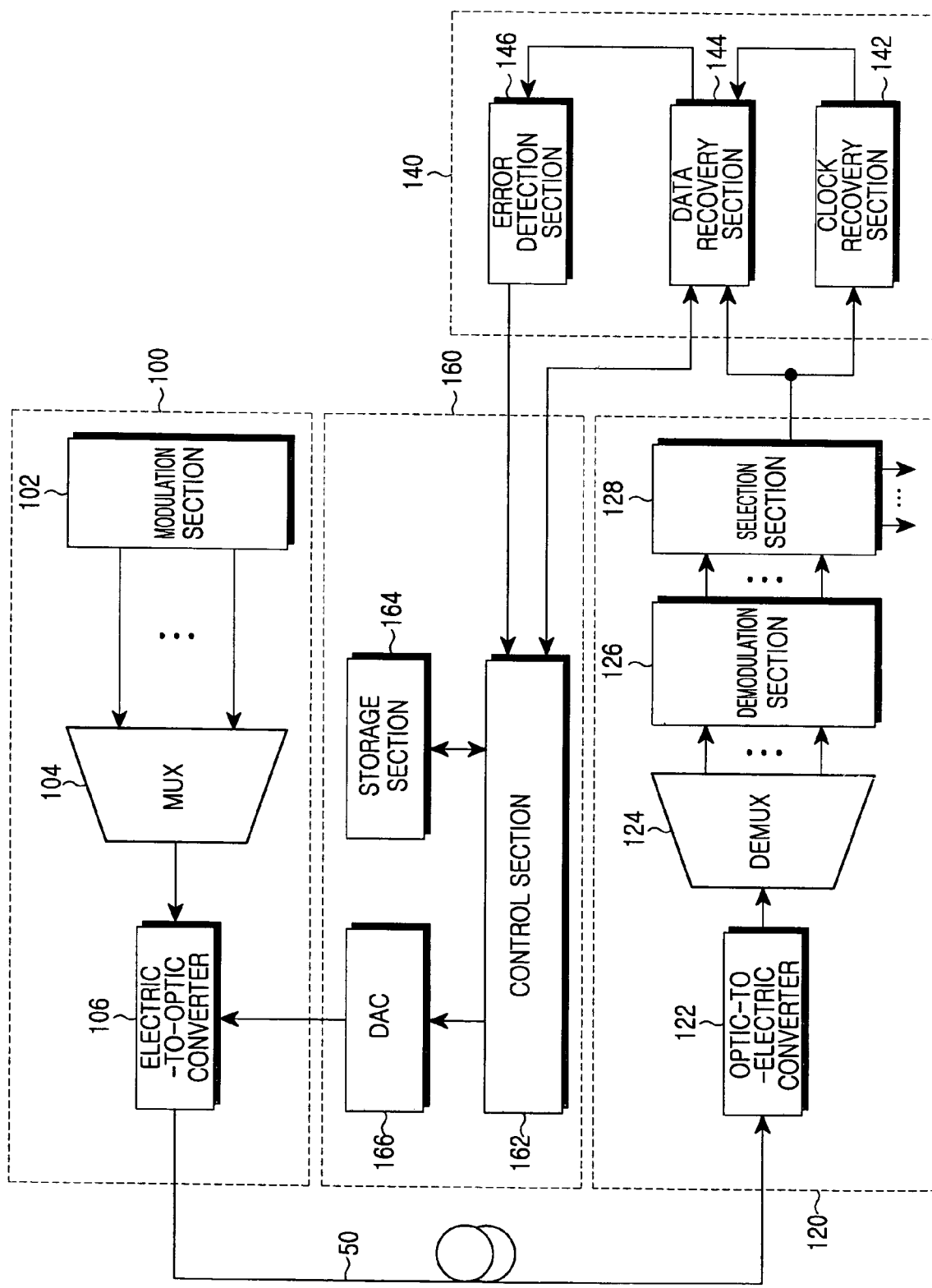
FIG. 2 is a block diagram of an optical transmission system for optimizing the bias of a laser diode during an SCM analog optical transmission according to an embodiment of the present invention.

FIG. 2 is a block diagram of an optical transmission system for optimizing the bias of a laser diode during an SCM analog optical transmission according to the embodiment of the present invention. As illustrated, the optical transmission system includes an optical transmitter 100, an optical receiver 120, a recovery unit 140, and a bias adjuster 160.

Briefly, the optical transmitter 100 converts a baseband electric signal into an optical signal using a laser diode (not illustrated) according to the set bias of the laser diode and then transmits the optical signal to the optical receiver 120 through an optical line 50. The optical receiver 120 converts the optical signal received from the optical transmitter 100 through the optical line 50 into the baseband electric signal. The recovery unit 140 detects an error generated according to the bias of the laser diode on the basis of the electric signal converted by the optical receiver 120. The bias adjuster 160 adjusts the bias of the laser diode optimally so that correct conversion of the electric signal into the optical signal can be achieved in the optical transmitter 100. In this regards, the bias adjuster 160 calculates an intermediate value of a bias section in which an eye-opening area is maximum according to the error detected by the recovery unit 140, then adjusts the bias of the laser diode optimally based on the calculated intermediate value.

As described above, the bias of the laser diode can be adjusted easily by detecting the error of the transmitted optical signal and then optimizing the bias of the laser diode automatically on the basis of the intermediate value of the bias section in which the eye-opening area becomes maximum (explained later). In addition, the optical receiver 120 receives the optical signal in which the bias of the laser diode is adjusted automatically in consideration o f the optical signal transmission state of the optical line 50 (explained later), thus a more favorable optical signal can be received and restored.

Now, a detailed description of each component of the optical transmission system according to the embodiment of the present invention will be described hereinafter.

Referring to FIG. 2, the optical transmitter 100 includes a modulation section 102, a multiplexer (MUX) 104, and an electric-to-optic converter 106. The modulation section 102 modulates a plurality of baseband electric signals by combining the baseband electric signals with a subcarrier. The multiplexer 104 multiplexes the plurality of electric signals modulated by the modulation section 102 into one electric signal. Then, the electric-to-optic converter 106 converts the electric signal multiplexed by the multiplexer 104 into an optical signal on the basis of the bias of the laser diode set according to the control of the bias adjuster 160. Thereafter, the optical signal converted by the electric-to-optic converter 106 is transmitted to the optical receiver 120 through the optical line 50.

The optical receiver 120 includes a optic-to-electric converter 122, a demultiplexer (DEMUX) 124, a demodulation section 126, and a selection section 128. The optic-to-electric converter 122 converts the optical signal received through the optical line 50 into an electric signal. The demultiplexer 124 demultiplexes the electric signal converted by the optic-to-electric converter 122 into a plurality of electric signals. The demodulation section 126 demodulates the baseband electric signals by detecting the subcarrier from the plurality of demultiplexed electric signals. The selection section 128 outputs the plurality of electric signals demodulated by the demodulation section 126, and selects a digital signal modulated by the modulation section 102 among the plurality of electric signals. Finally, the recovery unit 140 detects the error on the basis of the digital signal selected by and outputted from the selection section 102.

The recovery unit 140 includes a clock recovery section 142, a data recovery section 144, and an error detection section 146. The clock recovery section 142 restores a sampling clock with respect to the baseband digital signal outputted from the selection section 128. The data recovery section 144 restores the electric signal data outputted from the selection section 128, by forming an eye-opening parameter having a voltage value and a phase value as its variable with respect to the electric signal outputted from the selection section 128 and by comparing the size of the electric signal with a threshold value set in the eye-open parameter. Note that the term "eye-opening" is for naming a shape of a wave-shaped figured displayed in an oscilloscope screen. In particular, an oscilloscope device typically employs 5 acquisition channels to sample the input data, both of which an be varied in voltage and phase across the data eye The outputs of each channel can be compared, and any differences logged into a counter. Errors, which is the differences between the channels, can be counted over predetermined intervals so the final error count can be translated into an error rate. As one acquisition channel carries in-service data, the other channel can be used to scan the data eye and determine the bit error rate relative to the in-service channel. Thus, the eye-opening area illustrates the operation of acquisition channels and its related bit error rate. It should be noted that there are many oscilloscopes available commercially and well known in the art that can be performed in a variety of ways.

The data recovery section 144 is comprised of an "in-service channel" that outputs the restored data as its output, and an "out-of-service channel" for detecting the error generated according to the bias error of the laser diode. The error detection section 146 detects the error with respect to the "in-service channel" as changing the voltage value and the phase value of the "out-of-service channel." At this time, the error detection section 146 determines the error when the data value of the fixed "in-service channel" is different from that of the variable "out-of-service channel". In the embodiment of the present invention, a "VSC8123" chip of "VITESSE" Company may used as the recovery unit 140.

The bias adjuster 160 includes a control section 162, a storage section 164, and a digital-to-analog converter (DAC) 166. The control section 162 controls the adjustment of the bias of the laser diode in the bias adjuster 160. The storage section 164 stores the error value of the electric signal detected by the error detection section 146. The DAC 166 adjusts the bias of the laser diode of the electric-to-optic converter 106 by converting the input digital signal into the analog signal and inputting the analog signal to the laser diode of the electric-to-optic converter 106. The control section 162 compares and analyzes the eye-opening area on the basis of the error value stored in the storage section 164. Note that the eye opening has a larger area in a section in which the linearity of the laser diode is good. This eye-opening area is changed according to the bias applied to the laser diode. The intermediate point of the eye opening calculated by the control section 162 becomes the optimum value of the bias of the laser diode.

Accordingly, the control section 162 transmits to DAC 166 the intermediate point value of the bias section of the laser diode, in which the electric signal is converted into the optical signal having the maximum eye-opening area that is a digital signal and is obtained by the calculated error value. The DAC 166 converts the digital signal that corresponds to the intermediate point value into the analog signal and applies the analog signal converted corresponding to the intermediate point value to the electric-to-optic converter 106. The electric-to-optic converter 106 optimizes the bias of the laser diode according to the intermediate point value of the bias section of the laser diode that corresponds to the maximum eye opening.

Figure 3:
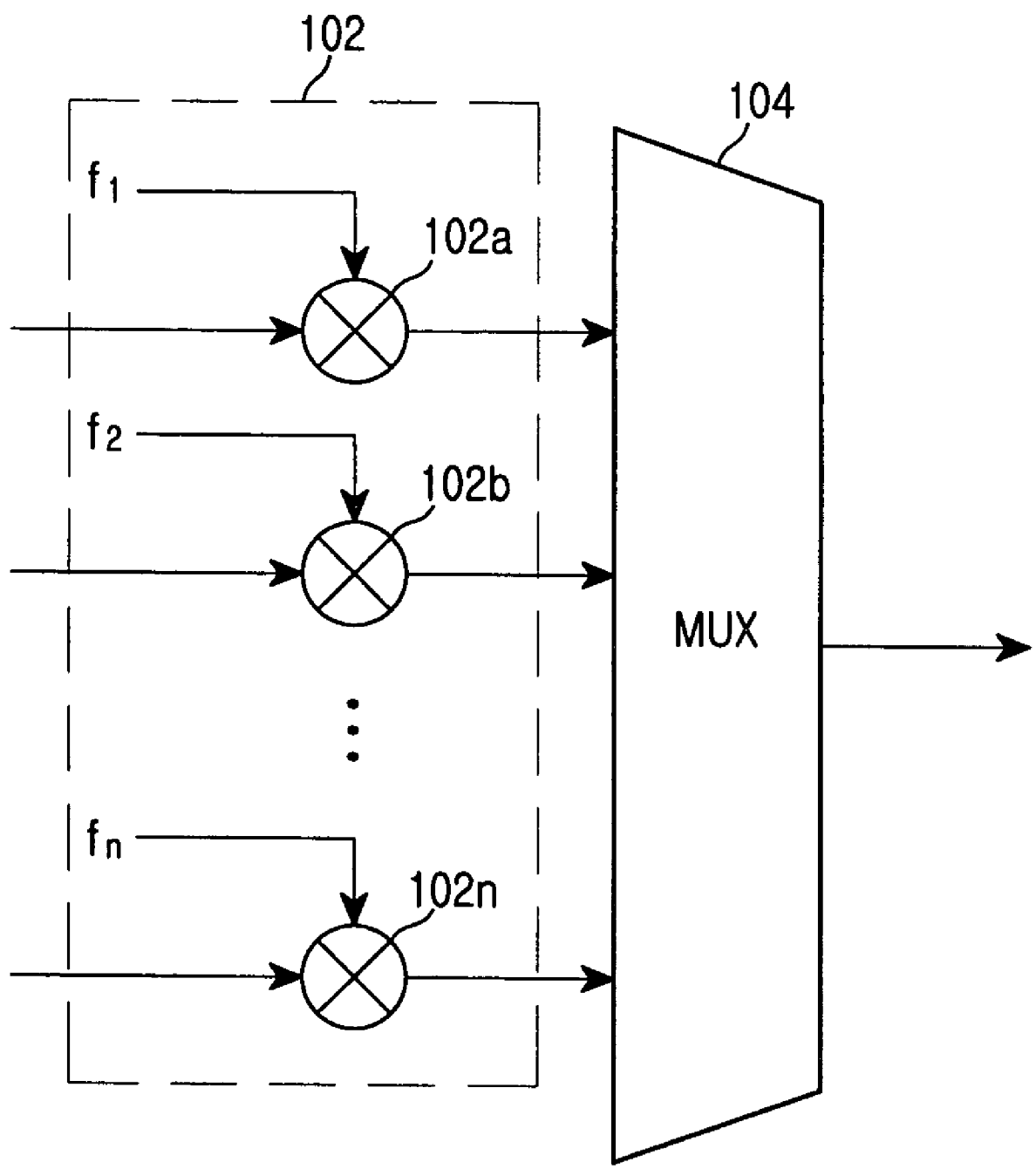
FIG. 3 is a view illustrating in detail the modulation section of FIG. 2.

FIG. 3 is a view illustrating in detail the modulation section 102 of FIG. 2. As shown, the modulation section 102 includes n combining sections 102a, 102b, . . . , 102n for modulating the baseband electric signals by combining n baseband electric signals with n subcarriers. The electric signals modulated by the n subcarriers are applied to the multiplexer 104 to be multiplexed into one electric signal.

Figure 4:
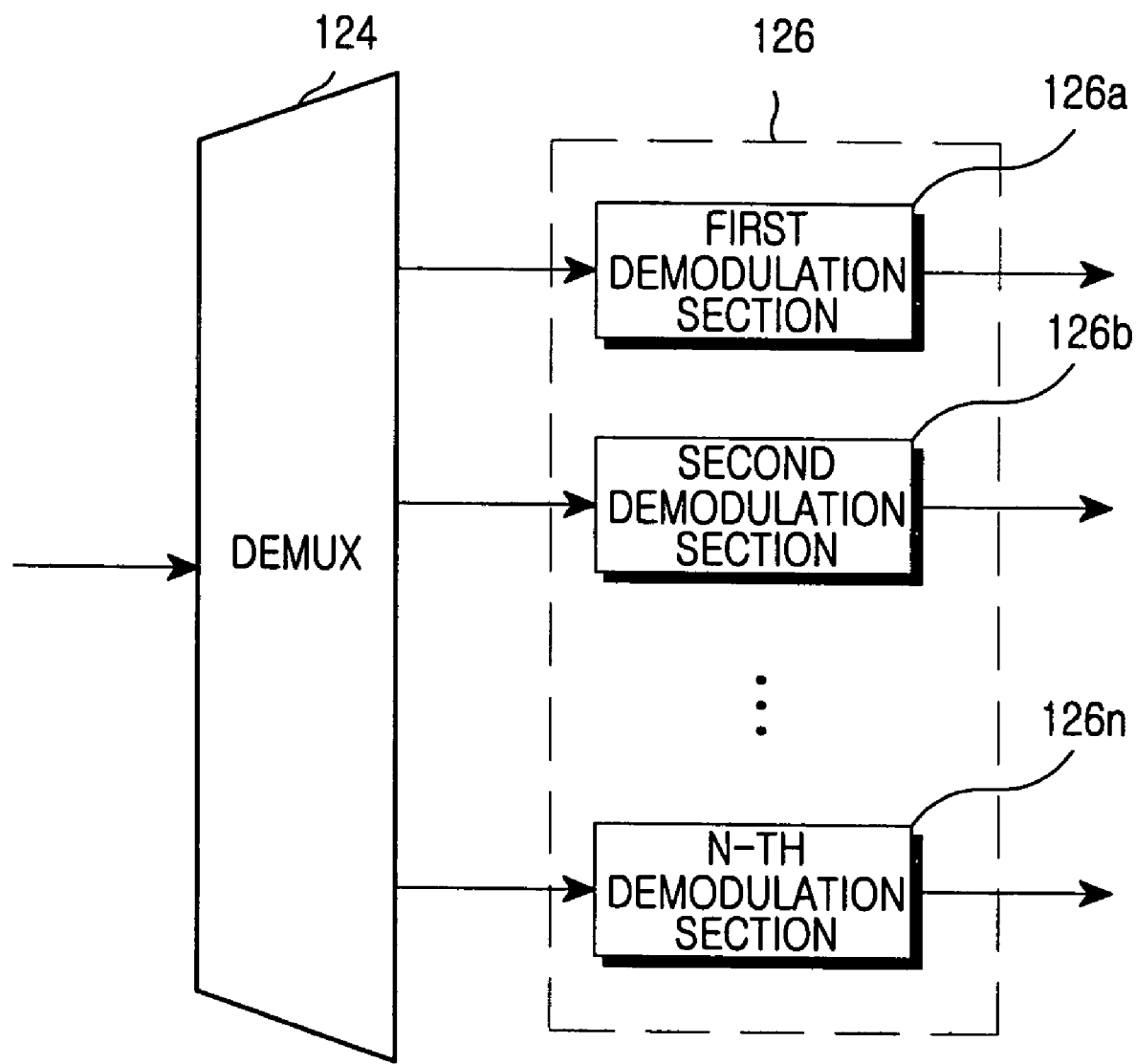
FIG. 4 is a another view illustrating in detail the demodulation section of FIG. 2.

FIG. 4 is a view illustrating in detail the demodulation section 126 of FIG. 2. As shown, the demodulation section 126 includes n demodulation sections 126a, 126b, . . . , 126n for demodulating the electric signals by detecting the subcarriers from n electric signals demultiplexed by the demultiplexer. The demodulated baseband electric signals are selectively outputted to the clock recovery section 142, the data recovery section 144, and the outside by the selection section 128.

Having thus described a preferred embodiment of an optical transmission system, it should be apparent to those skilled in the art that certain advantages of the system have been achieved. In particular, the bias optimization of the laser diode can be more easily performed by detecting the error generated according to the bias of the laser diode and automatically optimizing the bias of the laser diode on the basis of the intermediate value of the bias section in which the eye-opening area becomes maximum. Moreover, as the optical transmission system includes the optimization function of the bias of the laser diode, the modularity for the SCM analog optical transmission becomes possible. Furthermore, a more optimal optical signal can be created and restored by automatically and optimally adjusting the bias of the laser diode whenever the error values generated in the optical signal is changed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical transmission system for optimizing a bias of a laser diode, comprising:
   an optical transmitter, including an electric-to-optical converter with a laser diode disposed within the electric-to-optical converter for converting baseband electric signals into an optical signal and outputting the optical signal through an optical line;
   an optical receiver for converting the optical signal received from the optical transmitter into the baseband electric signals;
   a recovery unit for detecting an error generated according to the bias of the laser diode on the basis of the electric signals converted by the optical receiver; and
   a bias adjuster including a digital-to-analog converter (DAC), for optimally adjusting the bias of the laser diode within the electric-to-optical converter on the basis of a value of the error detected by the recovery unit.

2. The optical transmission system of claim 1, wherein the optical transmitter comprises:
   a modulation section for modulating a plurality of baseband electric signals by combining the baseband electric signals with a subcarrier;
   a multiplexer for multiplexing the plurality of electric signals modulated by the modulation section into one electric signal; and,
   the electric-to-optic converter for converting the electric signal multiplexed by the multiplexer into an optical signal on the basis of the bias of the laser diode within the electric-to-optical converter and set according to the control of the bias adjuster.

3. The optical transmission system of claim 1, wherein the optical receiver comprises:
   a optic-to-electric converter for converting the optical signal transmitted from the electric-to-optic converter into an electric signal of a set level;

a demultiplexer for demultiplexing the electric signal converted by the optic-to-electric converter into a plurality of electric signals;

a demodulation section for demodulating the baseband electric signals by detecting the subcarrier from the plurality of demultiplexed electric signals; and a selection section for outputting the plurality of demultiplexed electric signals and selecting a digital electric signal modulated by the modulation section from the plurality of electric signals.

4. The optical transmission system of claim 1, wherein the recovery unit comprises:

a clock recovery section for recovering a sampling clock with respect to the digital electric signal outputted from the selection section;

a data recovery section for recovering data of the electric signal outputted from the selection section through the recovered sampling clock and an eye-open parameter; and, an error detection section for detecting the error value for the bias of the laser diode with respect to the electric signal by comparing each signal distributed in the eye-open parameter with a specified phase value and voltage value with a threshold value fixedly set in the eye-open parameter.

5. The optical transmission system of claim 4, wherein the recovery unit comprises a "VSC8123" chip.

6. The optical transmission system of claim 1, wherein the bias adjuster comprises:

a storage section for storing the error value for the electric signal detected by the error detection section;

a control section for controlling an operation for adjusting the bias of the laser diode and for calculating an optimum bias value of the laser diode on the basis of the error value stored in the storage section; and, the digital-to-analog converter for optimally adjusting the bias of the laser diode within the electric-to-optical converter by converting the optimum value into an analog signal.

* * * * *

UNITED STATES PATENT AND TRADEMARK OFFICE
CERTIFICATE OF CORRECTION

PATENT NO. : 7,218,863 B2 Page 1 of 1
APPLICATION NO. : 10/638453
DATED : May 15, 2007
INVENTOR(S) : Chang-Hyun Lee et al.

It is certified that error appears in the above-identified patent and that said Letters Patent is hereby corrected as shown below:

Title Page
Item [75], country of inventors Yun-Je Oh and Jun-Ho Koh, should read as follows:

--KR.--

Signed and Sealed this

Third Day of July, 2007

JON W. DUDAS
*Director of the United States Patent and Trademark Office*